United States Patent

[11] 3,618,638

| [72] | Inventors | John M. Yarlott<br>Harvard;<br>Clyde A. Abbott, Still River, both of Mass. |
|---|---|---|
| [21] | Appl. No. | 42,293 |
| [22] | Filed | June 1, 1970 |
| [45] | Patented | Nov. 9, 1971 |
| [73] | Assignee | Trish Energetics, Inc.<br>Harvard, Mass. |

[54] PNEUMATIC CONTROL APPARATUS
12 Claims, 1 Drawing Fig.

[52] U.S. Cl. .......................................................137/625.66,
92/92, 91/424
[51] Int. Cl. .......................................................F16k 11/07,
F16b 19/04, F15b 15/10
[50] Field of Search.......................................... 91/424,
425; 92/42, 92, 89, 91; 137/596.18, 625.6, 625.66

[56] References Cited
UNITED STATES PATENTS

| 2,483,088 | 9/1949 | De Haven...................... | 92/92 X |
| 2,678,027 | 5/1954 | Kirk et al....................... | 91/424 X |
| 2,789,580 | 4/1957 | Woods.......................... | 92/47 |
| 3,013,534 | 12/1961 | Marette........................ | 92/92 X |

FOREIGN PATENTS

| 674,031 | 6/1952 | Great Britain................ | 251/61 |

*Primary Examiner*—Henry T. Klinksiek
*Attorney*—McCormick, Paulding & Huber

ABSTRACT: A pneumatic two-hand control apparatus for a machine or the like including a pressure-responsive actuator and a pneumatic control circuit comprising a servomechanism for operating an associated spool valve. A pair of manually operable actuating valves connected in parallel relation in the circuit between the actuator and a pressure source are arranged for substantially simultaneous operation to release pressure from a pair of pressure accumulators to produce a resultant pressure pulse of sufficient magnitude to operate the actuator. The actuator comprises an axially elongated flexible tin-walled shell defining a pressure chamber of variable volume adapted for radial expansion and axial contraction in response to increase in pressure therein.

PATENTED NOV 9 1971
3,618,638
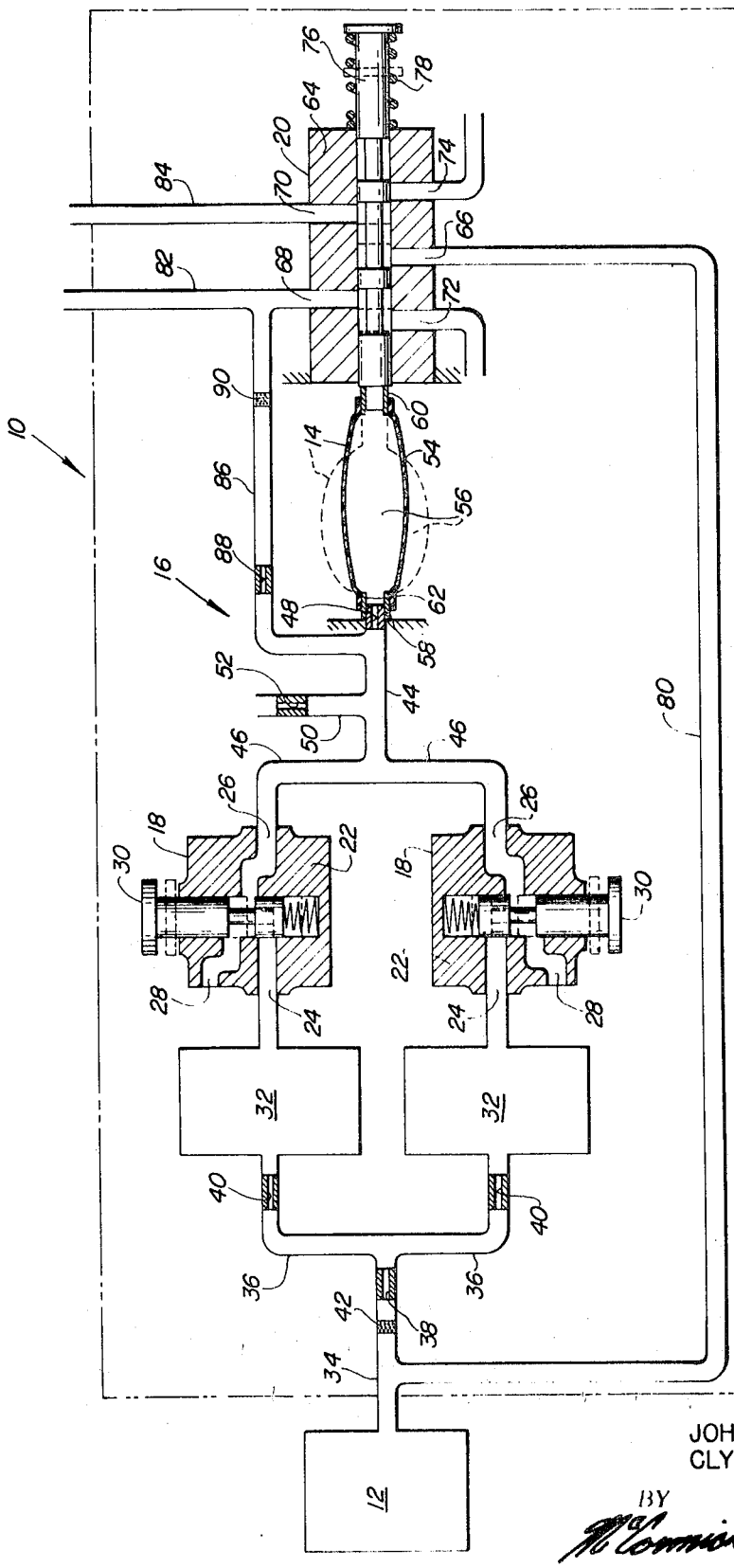
INVENTORS
JOHN M. YARLOTT
CLYDE A. ABBOTT
BY *McCormick, Paulding & Huber*
ATTORNEYS

3,618,638

PNEUMATIC CONTROL APPARATUS

BACKGROUND OF THE INVENTION

This invention relates in general to pneumatic control apparatus and deals more particularly with an improved pneumatic two-hand control apparatus for a machine or the like.

Although the apparatus of the present invention may be used to control any type of machine, it is particularly adapted for use as a safety control for a hazardous machine, such as a power press, shear or the like, where it is desired that the machine operator be required to have both hands clear of a danger area during the machine operating cycle. The present apparatus includes two manually operable actuating valves which must be operated simultaneously, or at least substantially simultaneously, to effect operation of an associated machine to be controlled. If one of the actuating valves is tied or otherwise retained in its operating position, the apparatus is rendered inoperative. The control apparatus is economical to manufacture and may be readily installed on a machine to be controlled, even by an inexperienced person.

SUMMARY OF THE INVENTION

In accordance with the present invention an improved pneumatic fluid control apparatus is provided which includes a pressure responsive actuator and a pneumatic control circuit including at least one pressure accumulator and a pair of manually operable actuating valves connected in parallel relation in the circuit between the actuator and a pressure fluid source. The circuit is constructed and arranged to release a pulse of pressure to the actuator having sufficient magnitude of effect the operation thereof when both of the actuating valves are operated substantially simultaneously and to exhaust pressure fluid if only one of the actuating valves is operated or if both valves are operated sequentially.

BRIEF DESCRIPTION OF THE DRAWING

A single FIGURE illustrates, somewhat schematically, a pneumatic control apparatus embodying the present invention.

DETAILED DESCRIPTION OF THE PREFERRED EMBODIMENT

In the drawing, a pneumatic control apparatus embodying the present invention is indicated generally at 10 and shown connected to a source of fluid or air under pressure designated by the numeral 12. The apparatus 10 preferably comprises a compact unitary structure adapted to be mounted on a machine to be controlled (not shown) and includes a pressure-responsive element or actuator 14 and a pneumatic control circuit indicated generally at 16 which connects the actuator 14 to the source 12. The circuit 16 includes at least one air pressure accumulator 32 for containing a pressure charge and a pair of manually operable actuating valves 18, 18 arranged to be operated simultaneous, or at least substantially so, to release a pressure pulse from the accumulator to the actuator to effect operation thereof. When both valves are operated substantially simultaneously, the pressure pulse released thereby is of sufficient magnitude to operate the actuator 14. However, if only one of the actuating valves 18, 18 is operated or if both of the valves are operated sequentially, the magnitude of the released pressure pulse will be insufficient to operate the control apparatus.

The actuator 14 converts pneumatic input to mechanical output and may, if desired, be coupled directly to a part of a machine to be controlled. Thus, for example, the actuator may be connected to the clutch rod of an associated machine to effect operation thereof. However, in the illustrated apparatus, the actuator 14 and its associated pneumatic circuit 16 comprises a servomechanism for operating a control valve 20 which, in turn, functions to supply air under pressure to initiate operation of another machine (not shown).

The valves 18, 18 are three-way, hand-operated control valves and each has a housing 22 and includes an inlet port 24, an outlet port 26 and an exhaust port 28. Each actuating valve has a manually movable actuating member or button 30 spring biased to an inactive or ready position indicated in full lines. When each button 30 is in its ready position, its outlet port 26 is connected with its exhaust port 28. Each actuating button 30 is manually movable to another or active position shown in broken lines. In the latter position, the valve inlet port 24 is connected to the outlet port 26 so that a flow path is provided therebetween.

The pneumatic control 16 is hereinafter described in further detail includes a plurality of the conduits or air lines which provide flow paths from the source 12 to the actuator 14. A plurality of metering orifices associated with various lines regulate flow of pressure fluid therethrough. The illustrated apparatus is particularly adapted for connection to a pressure source 12 which supplies air at pressures of from 60 to 100 pounds per square inch and the presently preferred size of each orifice is indicated to aid in understanding and practicing the invention. However, it should be understood that the size and arrangement of these orifices may vary in accordance with the design of the apparatus and such variations are contemplated within the scope of the invention.

The apparatus may be designed to operate in response to a pressure pulse supplied by a single pressure accumulator, as for example, where a pressure regulator is provided between the source 12 and the pneumatic circuit 16 so that a constant air supply pressure is maintained. Preferably, and as shown, the circuit 16 includes two pressure accumulators 32, 32. The volume of each accumulator is determined by the various design characteristics of the apparatus. Each accumulator is connected to an associated valve inlet port 24. The accumulators 32, 32 are, in turn, connected to the source 12 by a supply air line 34 and branch air lines 36, 36. A metering orifice 38 in the line 34 regulates airflow from the source 12 to the accumulators 32, 32 and preferably has a diameter of ten one-thousandths of an inch (0.010). Each of the lines 36, 36 also has a metering orifice 40 therein for a purpose to be hereinafter discussed. Each orifice 40 is sixteen one-thousandths of an inch (0.016) in diameter. Preferably, and as shown, an air filter 42 is positioned in the line 34 upstream of the metering orifice 38 to assure a supply of clear air to the circuit 16. Connection between the actuator 14 and the valves 18, 18 is provided by an air line 44 and branch air lines 46, 46. Each of the latter branch lines is connected to the line 44 and to an associated valve outlet port 26. A metering orifice 48 in the line 44 regulates air flow from the circuit 16 to the actuator 14. The orifice 48 has a diameter of sixty one-thousandths of an inch (0.060). The pneumatic circuit 16 also includes a bleed port 50 connected to the line 44 upstream of the metering orifice 48, which provides a means for reducing fluid pressure in the lines 46, 46 and 44 which connect the valves 18, 18 to the actuator 14. Another metering orifice 52 associated with the bleed port 50 regulates flow of exhaust air therefrom and has a diameter of forty one-thousandths of an inch (0.040).

The pressure responsive actuator 14 converts fluid energy input to mechanical output and may take various forms, but preferably, and as shown, it comprises an axially elongated flexible thin-walled shell 54 which defines a pressure chamber 56 of variable volume and has coaxially aligned coupling members 58 and 60 secured to opposite ends thereof. The coupling member 58 is secured to the frame of the apparatus 10 and to the line 44 and defines an inlet opening 62 which communicates with the chamber 56 and with the line 44. The shell 54 is adapted for radial expansion and axial contraction in response to changes in pressure in the chamber 56, axially extended and contracted positions of the shell 54 being respectively indicated in full and broken lines. The shell 54 is preferably formed from elastomeric material suitably reinforced so that the surface area thereof remains substantially constant both in its extended and contracted positions. Thus, substantially all fluid energy input is consumed in moving the coupling member 60 toward the coupling member 58 and little or no fluid energy is expended in stretching the shell material. In its axially contracted position or inflated condition, the actuator 14 is characterized by a generally prolate spheroidal configuration. When the actuator is in its axially extended position, the shell 54 has a generally convoluted cross-sectional configuration characterized by a plurality of circumaxially spaced ridges and valleys. The shell is biased to its axially extended position and movable to its contracted position in response to a predetermined pressure pulse received from the pneumatic circuit 16. In the illustrated case, biasing force is provided by a spring associated with the control valve 20. The actuator 14 is preferably adapted to operate in response to an applied pressure of approximately 15 pounds per square inch. For a more complete disclosure regarding the presently preferred actuator 14, reference may be had to the copending application of John M. Yarlott, Ser. No. 857,463, filed Oct. 20, 1969, and entitled "Fluid Actuator."

The illustrated control valve 20 comprises a four-way packless spool valve and has a body 64 secured to the frame of the apparatus 10. It includes an inlet port 66, outlet ports 68 and 70 and exhaust ports 72 and 74. A movable part or valve spool 76 slidably received in the body 64 is connected at one end to the coupling member 60. The spool is biased to a first position corresponding to the axially extended position of the actuator 14 by a spring 78 which acts between its other end and the valve body 64. When the spool 76 is in its first position, the inlet port 66 communicates with the outlet port 70 and the outlet port 68 is connected to the exhaust port 72. The spool 76 is movable to a second position corresponding to the axially contracted position of the actuator 14 in response to simultaneous manual operation of the actuating buttons 30, 30. When the spool 76 is shifted to its second position, the inlet port 66 communicates with the outlet port 68 and the outlet port 70 is connected to the exhaust port 74. Air may be supplied to the valve 20 from any convenient source, but in the illustrated case, it is supplied through a line 80 which connects the inlet port 66 to the supply air line 34. Air lines 82 and 84 respectively connected to the outlet ports 68 and 70 are provided for connecting the control apparatus 10 to an associated machine to be controlled and may, for example, be connected to a two-way pilot valve (not shown) associated with the machine. In the illustrated case, another air or bleed line 86 is connected between the line 82 and the line 44. The line 86 also contains a metering orifice 88 and a filter 90 positioned between the latter metering orifice and the line 82. The metering orifice 88 has a diameter of sixteen one-thousandths of an inch (0.016).

Considering now the operation of the control apparatus 10, at the start of the operating cycle, each actuating button 30 is in its ready position and each accumulator 32 contains a charge of air under pressure. When both buttons 30, 30 are simultaneously depressed or moved to their active position, air flows from the accumulators 32, 32 through the valves 18, 18 and through the lines 46, 46 and 44 and through the metering orifice 48 into the chamber 56. Some air may escape through the metering orifice 52 associated with the bleed port 50. However, the pressure pulse released from the accumulators 32, 32 by simultaneous operation of the valves 18, 18 is of sufficient magnitude to compensate for fluid loss through the orifice 52 and inflate the actuator 14. As the actuator 14 moves to its axially contracted position, the valve spool 76 shifts to its second position against the bias of the spring 78. A change in the path of the airflow from the supply air line 80 through the valve 20 occurs when the valve spool shifts. More specifically, when the valve spool attains its second position the line 84 is connected to the exhaust port 74 and the supply line 80 is connected to the line 82. Some air under pressure is bled from the line 82 through the line 86 and enters the line 44. This bleed air aids to maintain the actuator 14 in its inflated condition for as long as the two actuating buttons 30, 30 are maintained in depressed position.

When one of the buttons 30, 30 is released or returned to its ready position, the outlet port 26 of the associated valve is connected to the exhaust port 28 thereof. Air in the lines 46, 46 and 44 is then exhausted through the latter port. In the presently preferred embodiment of the invention, each exhaust port 28 has a diameter of sixty one-thousandths of an inch (0.060). Since the diameter of each exhaust port is substantially larger than the diameter of the metering orifice 58, it will be evident that air will escape from each exhaust port 28 at a faster rate than it can be supplied to the circuit 16 by the line 86. As pressure in the chamber 56 decreases, the spring 78 acts upon the valve spool 76 to bias it toward its first position. When the valve spool attains its first position, the line 84 is again connected to the air supply line 66 and the line 82 is simultaneously connected to its associated exhaust port 72.

Both actuating buttons 30, 30 must be released or returned to ready position so that the accumulators 32, 32 may be recharged to prepare the apparatus for its next operating control feature of the apparatus, as by tying down the actuating button 30 on one of the valves 18, 18 to retain the valve in an open or active position, the control apparatus 10 cannot be operated. A flow path will be established from the inlet port to the outlet port of the open valve 18. Thus pressure fluid may flow from the source 12 through the open valve to and through the lines 46, 46 to the other valve where it is exhausted. The orifice 52 also serves to bleed air from the pneumatic circuit 16 at a greater rate than the orifice 38 can supply air thereto. Thus, the orifices 38 and 52 cooperate to prevent pressure buildup in the apparatus in the event of abnormal operation. The orifice 48 is also designed to cooperate with the vent orifice 52 and with the exhaust port 28 of one of the valves 18, 18 to prevent operation of the actuator 14 by a single pressure pulse released by operation of the other of the valves.

An inexperienced operator may encounter difficulty in attaining precise simultaneous operation of both control valves 18, 18. For this reason, provision has been made to render to apparatus 10 operative even though one accumulator may be discharged an instant before the other, as by operating one valve 18 an instant before the other valve 18 is operated. The metering orifices 40, 40 regulate retrograde or back flow in the branch lines 36, 36 which connect the accumulators. Thus, pressure fluid cannot surge from the charged accumulator to the discharged one when one actuating valve is operated an instant before the other.

The invention may be practice with various types of actuating valves, but preferably the valves selected should be of a type which has a small amount of blowby. A valve of the latter type is constructed and arranged so that air may escape from the valve through its exhaust port if the valve actuating button is only partially depressed. This valve arrangement prevents the apparatus from operating if one of the valve actuating buttons is maintained in a partially depressed position.

We claim:

1. A pneumatic control apparatus for a machine or the like comprising a pressure-responsive actuator, and a control circuit for connecting said actuator to a pneumatic fluid pressure source, said circuit including at least one pressure accumulator for containing a pressure charge received from said source, metering means for regulating flow of pressure fluid from said source to said accumulator, a pair of manually operable actuating valves, each of said valves having an inlet port connected to said one accumulator, an outlet port, and an exhaust port, each of said actuating valves having a manually operable actuating member movable from one position wherein said outlet port communicates with said exhaust port and another position wherein said inlet port communicates with said outlet port, and first conduit means connecting each said outlet port to the other said outlet port and to said pressure responsive actuator, said actuator being movable from one position to another position in response to the pressure charge received for said one accumulator upon substantially simultaneous movement of each said actuating member to said other position.

2. A pneumatic control apparatus as set forth in claim 1 wherein said pressure responsive actuator comprises an axially elongated flexible thin-walled shell defining a pressure chamber of variable volume, said shell being adapted for radial expansion and axial contraction and movement from an axially extended to an axially contracted position in response to increase in pressure in said chamber, said first conduit means communicating with said chamber, and including means for biasing said shell toward said axially extended position, said shell being movable to said axially contracted position in response to substantially simultaneous movement of each said actuating member to said other position.

3. A pneumatic control apparatus as set forth in claim 2 wherein said actuator has a generally prolate spheroidal configuration in said axially contracted position.

4. A pneumatic control apparatus set forth in claim 1 wherein said control circuit includes a pair of pressure accumulators and second conduit means connecting each of said accumulators to the other of said accumulators and to the fluid pressure source, each of said accumulators being connected to an associated one of said actuating valve inlet ports.

5. A pneumatic control apparatus as set forth in claim 4 wherein said second conduit means includes one line connected to said fluid pressure source and a pair of branch lines, each of said branch lines being connected to said one line and to an associated one of said accumulators, said metering means for regulating flow of pressure from said source being associated with said one line, and including additional metering means associated with each of said branch lines.

6. A pneumatic control apparatus as set forth in claim 1 including means for biasing said actuator to said one position.

7. A pneumatic control apparatus as set forth in claim 6 including a control valve having an inlet port for connection to a fluid pressure source at lest one outlet port, and at least one exhaust port, said control valve having a movable part connected to said actuator and movable therewith between first and second positions respectively corresponding to said one and said other position said outlet port being connected to said exhaust port when said part is in said first position, said inlet port being connected to said outlet port when said part is in said second position, and a bleed line connected between said control valve outlet port and said first conduit means.

8. A pneumatic control apparatus as set forth in claim 7 including metering means associated with said bleed line for regulating flow of pressure fluid between said first conduit means and said control valve outlet port.

9. A pneumatic control apparatus as set forth in claim 1 including means for reducing fluid pressure in said first conduit means.

10. A pneumatic control apparatus as set forth in claim 9 wherein said means for reducing fluid pressure comprises a bleed port associated with said first conduit means for venting pressure fluid therefrom.

11. A pneumatic control apparatus as set forth in claim 10 including metering means associated with said bleed port for regulating flow of pressure fluid vented therefrom.

12. A pneumatic control apparatus as set forth in claim 1 wherein each of said actuating members comprises an operating button biased to said one position and manually movable to said other position.

* * * * *

PO-1050
(5/69)

UNITED STATES PATENT OFFICE
CERTIFICATE OF CORRECTION

Patent No. 3,618,638      Dated November 9, 1971

Inventor(s) John M. Yarlott and Clyde A. Abbott

It is certified that error appears in the above-identified patent and that said Letters Patent are hereby corrected as shown below:

Col. 1, line 15, "most" should read --must--.
Col. 2, line 12, "control" should read --circuit--.
Col. 2, line 16, after "with" insert --the--.
Col. 3, line 19, "857,436" should read --867,463--.
Col. 4, line 8, "58" should read --88--.
Col. 4, line 37, after "render" delete "to" and substitute --the--
Col. 4, line 47, "practice" should read --practiced--.
Col. 5, line 16, after "apparatus" insert --as--.
Col. 6, line 3, "lest" should read --least--.

Signed and sealed this 16th day of May 1972.

(SEAL)
Attest:

EDWARD M. FLETCHER, JR.      ROBERT GOTTSCHALK
Attesting Officer      Commissioner of Patents